United States Patent
Thompson

[11] Patent Number: 5,947,336
[45] Date of Patent: Sep. 7, 1999

[54] DRY FOOD DISPENSER

[76] Inventor: Patrick Thompson, 25936 Monte Carlo Way, Mission Viejo, Calif. 92692

[21] Appl. No.: 09/050,563

[22] Filed: Mar. 30, 1998

Related U.S. Application Data

[60] Provisional application No. 60/042,480, Apr. 1, 1997.
[51] Int. Cl.[6] .............................. B67D 5/33; G01F 11/10
[52] U.S. Cl. ..................................... 222/153.13; 222/368
[58] Field of Search ............................... 222/153.13, 367, 222/378, 363, 370

[56] References Cited

U.S. PATENT DOCUMENTS

| | | | |
|---|---|---|---|
| 852,608 | 5/1907 | Hanlon . | |
| 895,346 | 8/1908 | Dacosta . | |
| 1,969,110 | 8/1934 | Teach | 221/106 |
| 2,585,198 | 2/1952 | Warren | 222/368 |
| 2,920,796 | 1/1960 | Field | 222/368 |
| 3,204,833 | 9/1965 | Weitzner | 222/368 |
| 4,053,087 | 10/1977 | Lack et al. | 222/278 |
| 4,805,811 | 2/1989 | Wetterlin | 222/337 |
| 5,292,037 | 3/1994 | Held | 222/339 |

*Primary Examiner*—Andres Kashnikow
*Assistant Examiner*—Keats Quinalty
*Attorney, Agent, or Firm*—Roger A. Marrs

[57] ABSTRACT

A dry food dispenser having a cylindrical container with a removable top or cap for covering a central storage area holding dry baby formula or other dry food commodity. The mid-section of the container includes a tapered funnel terminating in an opening. A rotatable cylinder is operably carried on the funnel having a pre-measured receptacle or cavity co-extensive with the funnel opening for collecting a quantity of the dry food product. Upon rotation of the cylinder, the receptacle carries the product from the funnel for external dispensing into a utility container for usage. A second pre-measured receptacle or cavity may be provided in the cylinder and a releasable retainer interconnects the container with the cylinder for holding the cylinder in a fixed position.

4 Claims, 1 Drawing Sheet

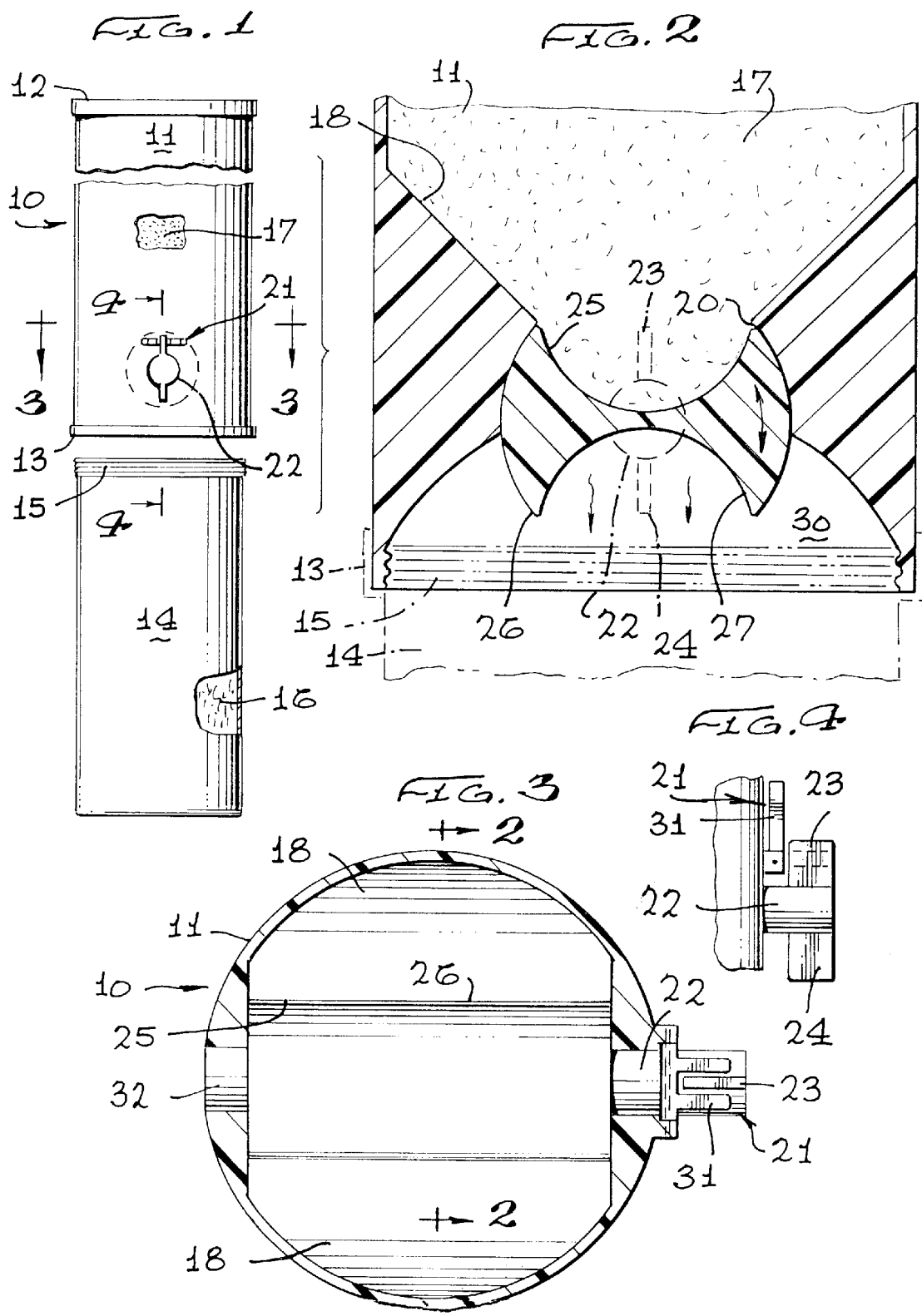

DRY FOOD DISPENSER

Priority Claimed on copending Ser. No. 60-042,480 filed Apr. 4, 1997.

BACKGROUND OF THE INVENTION

1. Field of the Invention

The present invention relates to the field of food dispensing devices, and more particularly to a novel dispensing device for dry granular commodities, such as dry baby formula or the like, and which includes a pre-measuring device adapted to discharge a limited quantity of the dry food product or commodity at each operation.

2. Brief Description of the Prior Art

In the past, it has been the conventional practice to dispense food product in pre-measured quantities and such prior devices are disclosed in U.S. Pat. Nos. 852,603; 895,346; 1,969,110 and 2,585,198. Although these prior devices have been somewhat successful in dispensing pre-measured contents, such as soap, grain and the like, problems and difficulties have been encountered which stem largely from the fact that sanitation is important and the ability for the dispenser to detachably couple with a receiving container is important. Furthermore, particularly in the field of dispensing baby formula, such as dry food and the like, the dispenser must be adapted to connect with conventional baby bottle or baby formula containing devices so that upon removal of the dispensing device, a suitable cap or nipple can be attached to the container for dispensing purposes.

Furthermore, other problems and difficulties have been encountered when employing pre-measured apparatus in connection with dispensing of the dry commodity which relate to convenience and operability. In some conventional dispensing mechanisms, jamming occurs when dry commodities are employed where liquid does not cause jamming or the like. Small granules of baby formula may travel into crevices and cracks usually present when a turning mechanism is available so that scoring and jamming of the device often would occur.

Therefore, a long-standing need has existed to provide a dispensing device for dry formula, cereal or other commodity which may readily be detachably connected to a standard plastic baby bottle and bag so that a pre-measured quantity of the dry commodity may be collected from storage and introduced to the standard plastic baby bottle and bag. The pre-measuring section of the device must be non-jamming and must not only be adapted for manual use but include a releasable locking mechanism so as to hold the pre-measuring unit in a position for receiving the dry commodity from a storage area within the device.

SUMMARY OF THE INVENTION

Accordingly, the above problems and difficulties are averted by the present invention which provides a novel dry formula or cereal dispensing device which includes a cylinder having a removable top exposing a central storage area into which dry formula or dry commodity is placed. The other end of the storage compartment holding the dry commodity forms a funnel which terminates in an opening coextensive with a cavity formed in a cylinder. Upon rotation of the cylinder, dry commodity within the cavity is introduced directly into a standard container detachably connected to the end of the dispensing cylinder opposite from its end having the closure cap. If desired, a second cavity for pre-measuring the dry commodity may be placed on the opposite side of the cylinder so that as commodity is being introduced from the first cavity, the second cavity is in position to receive an additional measure of the dry commodity. Means are provided external of the storage compartment for releasably retaining the pre-measuring means in a fixed position. In one form, the cylinder is provided with a flanged stub outwardly projecting from the external surface of the container and which has a pair of flanges extending outwardly which may be selectively captured by a latch pivotally carried on the container. The latch and flanges are arranged so that in the latch position, at least one of the two pairs of pre-measure cavities is in position for receiving the dry commodity.

Means are also provided for detachably connecting the dispensing end of the cylindrical device with a standard container, such as a baby bottle or a cylindrical container having a bag therein which receives the dry commodity. In either case, the dispensing unit and the receiving container may be carried from place to place and may be used in feeding infants or babies while away from the home.

Therefore, it is among the primary objects of the present invention to provide a novel dry commodity dispensing apparatus which includes at least a pair of pre-measuring cavities movably disposed to collect a quantity of the dry commodity and to introduce the dry commodity to a second container for future dispensing to an infant or baby.

Another object of the present invention is to provide a novel dry commodity dispensing apparatus which is detachably connected to a dispensing container, such as a baby bottle or the like, and which includes pre-measuring means for collecting and dispensing a quantity of dry commodity to the baby bottle.

Yet another object of the present invention is to provide a novel dry commodity dispensing device having a latching mechanism registered with a pair of dispensing cavities which permit a pre-measured amount of dry commodity to be collected and introduced into a detachable dispensing container, such as a baby bottle or the like.

Still a further object resides in the provision of a rotating pre-measuring device for collecting a predetermined quantity of dry food product and which, when rotated, distributes the pre-measured product into a receiving container which may take the form of a baby bottle or the like for future dispensing to an infant or a baby.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is an exploded view of the novel dry product dispensing device of the present invention illustrated in combination with a conventional baby bottle container;

FIG. 2 is an enlarged transverse cross-sectional view illustrating the pre-measuring device incorporated into the dispensing device of FIG. 1 as taken in the direction of arrows 3—3 thereof;

FIG. 3 is a transverse cross-sectional view of the dispensing device and the pre-measuring section as taken in the direction of arrows 3—3 of FIG. 1; and FIG. 4 is a fragmentary elevational view of the latch means for registering the pre-measuring device or unit with the food product intended to be dispensed as taken in the direction of arrows 4—4 of FIG. 1.

DESCRIPTION OF THE PREFERRED EMBODIMENT

Referring to FIG. 1, the novel dry formula or cereal dispenser incorporating the present invention is illustrated in the general direction of arrow 10. The dispenser includes a cylindrical body 11 having an opening at one end which is closed by a removable cap 12. The other end of the body 11 includes a cap 13 which, when removed, permits a standard or conventional baby bottle 14 to be attached. Attachment is by means of a threaded connection and threads 15 are illustrated on the end of the baby bottle or container 14. As is the usual practice in infant or baby bottles, an external cylindrical container houses a flexible plastic bag 16 so that baby formula, milk or other ingredients can be placed into the bag 16 through the opening surrounded by threads 15. When ready for use, a standard dispensing nipple or the like may be attached to the threads 15. However, it is to be understood that the nipple dispenser and the standard bottle 14 are not a part of the present invention except for attachment to the dispensing unit 10.

With respect to;the dispenser 10, the upper portion of the body 11 includes an internal storage compartment which is occupied by a dry commodity or ingredient, such as cereal or baby formula, and the compartment as well as the dry commodity is indicated by numeral 17. The storage compartment is provided with a funnel-type bottom that includes a conical surface 18 which terminates in an opening 20 leading into a pre-measuring device (to be described later). The pre-measuring device is held in position by a latch means 21 externally carried on the body 11 and which cooperates with a pre-measuring device stud 22 outwardly projecting from the body 11. The stud includes a pair of flanges, indicated by numerals 23 and 24, which retain the pre-measuring A device in one of two positions.

Referring now in detail to FIG. 2, the storage compartment and dry commodity 17 are illustrated being funneled by the conical surface 18 into a first cavity 25 of a pre-measuring unit 26 which takes the form of an elongated cylinder. The cylinder 26 is formed with the first pre-measuring cavity 25 on one side and a second pre-measuring cavity 27 on its opposite side. A dispensing chamber, identified by numeral 30, is provided for conducting the pre-measured food product from a cavity into the opening of the receiving baby or infant container 14. When the container 14 is not threadably attached to the end of body 11, the cap 13 is used to enclose the cavity 30.

Referring now in detail to FIGS. 3 and 4, it can be seen that the cylinder 26 is retained in position by a latching mechanism taking the form of a pivoting latch 31. Also, it can be seen that the latch 31 may be selectively placed in registry with either flange 23 or 24 so that the selected pre-measuring cavity 25 or 27 may be in position to receive dry food product from the storage compartment 17. The latch mechanism locks the cylinder and stub 22 in a fixed position so that inadvertent dispensing of the dry food product cannot take place. The stub 22 is in coaxial relationship with respect to stub 32 on the opposite side of body 11 so that the cylinder 26 is pivotally rotatable with respect to the body.

In view of the foregoing, it can be seen that the dry. food dispenser of the present invention includes a storage compartment 17 which holds a bulk quantity of the dry food product, such as formula or cereal. A portion of the bulk food product is permitted to enter the pre-measure cavity 25 of the cylinder 26 and when the latch 31 is pivoted upwardly, the stub shaft 32, 22 is released to permit the cylinder to be rotated by the user by means of finger-grasping of flanges 23 or 24. When the cylinder has been rotated 180 degrees, the captured food product within chamber 25 is dumped into the waiting container 14. When rotation has ceased, the second pre-measure cavity 27 is in position to receive a portion of the bulk food product. The latch 31 may then be rotated over the associated flange for retention purposes so that the cylinder will not rotate inadvertently. Next, the container 14, whether it be a baby bottle or the like, may be removed from the bottom of container bottle 11 and cap 13 may be replaced to close-the dispensing or discharge cavity 30.

At a subsequent time, liquid may be added to the container bag 16 in order to liquify the dry food product so that the product is now ready for use by an infant or baby.

Preferably, the present inventive device is intended to operate as a baby formula/cereal dispenser for dry food product. The size of the container is of sufficient diameter and circumference to accept a standard plastic baby bottle and bag, such as is produced by the Playtex Company, by means of the threaded engagement in the bottom of the body 11. The storage compartment 17 is of sufficient size to hold a dry volume of 12 ounces of baby formula or cereal. The dispensing cylinder 26 is rotatably mounted in the bottom of the funnel or tube 18 and includes a horizontal turning axis through its entire length. Each of the two pre-measured cavities or depressions in the cylinder may hold one ounce or dry formula or cereal as an example.

The user will uncap the bottom by removing cap 13 and screw a conventional or standard baby bottle with the necessary plastic bag inside and in place into the body threads so as to make a seal therewith. Then, with a rotation of the handle flanges 23 and 24, the user can dispense the desired ounces without spillage or mess. The top of the dispenser has a screw lid 12 and the bottom cap may snap into place and may be used to collect any residue formula that may fall from the cylinder 26. The plastic horseshoe-shaped handle lock may selectively be placed over the dispenser handle flanges to stop accidental discharge of dry food product during transport. It is preferred that the inventive dispenser be made from dishwasher safe and translucent plastic and the top and bottom lid and cap can be of a non-translucent material and may be colored.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A dry food dispenser comprising:

a cylindrical container having a central internal storage area for holding a dry food product;

a removable top carried on one end of said container for selectively exposing said central internal storage area and the opposite end being a discharge opening for the dry food product;

said container having a tapered funnel disposed midway between the ends of said container with an opening intercommunicating said central storage area with said discharge opening;

an elongated cylinder rotatably carried on said funnel across said opening interfering with the intercommunication between said central internal storage area and said discharge opening;

said elongated cylinder having at least one receptacle for receiving dry food product from said central internal storage area and for releasing dry food product to said discharge opening when said cylinder is rotated;

two receptacles are provided on said cylinder and each receptacle being of a pre-selected measurement size;

a releasable latch means mounted on said container for releasably retaining said cylinder in a fixed non-rotatable position;

said two receptacles are alternately exposed to said central internal storage area; and said latch means further includes a flanged stub outwardly projecting from said cylinder and a slotted latch member movable towards said flanged stub for releasable engagement therewith.

2. The dry food dispenser defined in claim 1 wherein:

said discharge opening of said container includes screw threads for attachment with a receiving utility container for the dry food product.

3. The dry food dispenser defined in claim 2 wherein:

said cylinder is provided with end spindles rotatably mounted in a pair of bases in said container for rotatably mounting said cylinder with said container.

4. The dry food dispenser defined in claim 3 wherein:

said flanged stub further constitutes a handle available for manually rotating said cylinder between a first position with at least one receptacle for collecting dry food product and a second position with said receptacle for gravitational release of dry food product with said discharge opening.

* * * * *